United States Patent

Ortega et al.

[19]

[11] Patent Number: 6,085,159
[45] Date of Patent: Jul. 4, 2000

[54] DISPLAYING VOICE COMMANDS WITH MULTIPLE VARIABLES

[75] Inventors: Kerry A. Ortega, Deerfield Beach; Linda M. Boyer, Boca Raton; Thomas A. Kist, Boynton Beach, all of Fla.

[73] Assignee: International Business Machines Corporation, Armonk, N.Y.

[21] Appl. No.: 09/048,713

[22] Filed: Mar. 26, 1998

[51] Int. Cl.[7] .................................................. G10L 15/26
[52] U.S. Cl. .......................... 704/235; 704/270; 704/275; 704/231
[58] Field of Search .................................... 704/270, 271, 704/272, 275, 278, 231, 235, 276

[56] References Cited

U.S. PATENT DOCUMENTS

| | | | |
|---|---|---|---|
| 5,010,495 | 4/1991 | Willetts | 364/513.5 |
| 5,086,385 | 2/1992 | Launey et al. | 364/188 |
| 5,367,609 | 11/1994 | Hopper et al. | 704/278 |
| 5,465,378 | 11/1995 | Duensing et al. | 395/800 |
| 5,748,841 | 5/1998 | Morin et al. | 704/257 |
| 5,850,627 | 12/1998 | Gould et al. | 704/231 |
| 5,864,815 | 1/1999 | Rozak et al. | 704/275 |

*Primary Examiner*—David R. Hudspeth
*Assistant Examiner*—Vijay B Chawan
*Attorney, Agent, or Firm*—Quarles & Brady LLP

[57] ABSTRACT

A method for displaying voice commands with multiple variables in a speech application, comprises the steps of: compiling a list of each voice command which can include at least one variable; storing with each the voice command each variable associated with each voice the command in the list; displaying in response to a user request a command and each of its associated variables; and, displaying each of the associated variables within delimiters to indicate to the user that a choice must be made from a set of choices for each the associated variable together with the command. A set of choices for each stored variable can be stored. The set of the choices for each variable associated with the voice command and at least one word to use to select one of the choices in each the set when uttering the voice command can be supplied in response to a user request.

9 Claims, 1 Drawing Sheet

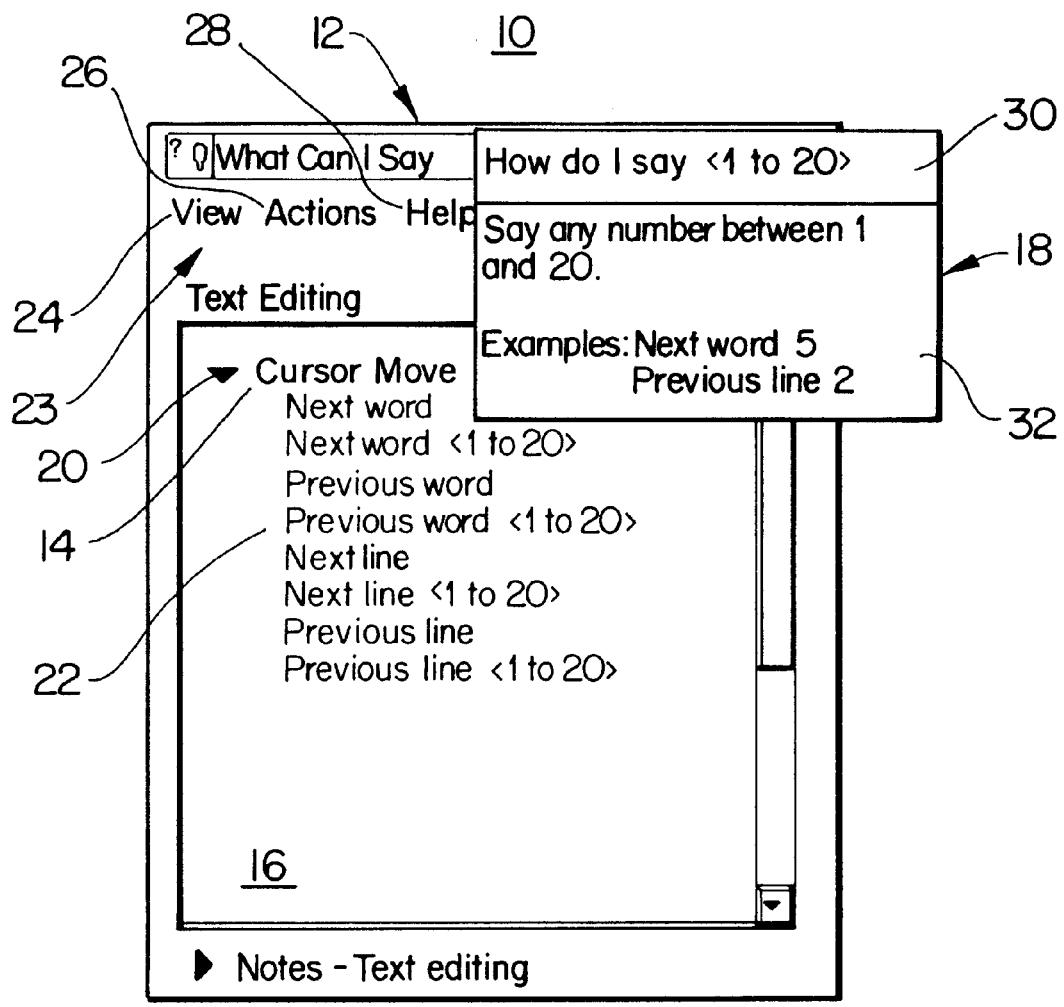

DISPLAYING VOICE COMMANDS WITH MULTIPLE VARIABLES

BACKGROUND OF THE INVENTION

1. Field of the Invention

This invention relates generally to the field of managing speech applications, and in particular, to an improved method for displaying voice commands with multiple variables.

2. Description of Related Art

A common function in speech applications is to display the commands that the user can say. Sometimes these voice commands can have multiple forms. Listing all these voice commands in a window would clutter the window. In fact, sometimes it is impossible to show all the possible combinations of the commands.

In most speech applications there is a function to list the voice commands that a user can say. This function is often called the What Can I Say (WCIS) function. Sometimes these voice commands can have multiple forms, as noted above. The commands to move a window, for example, might be: move window right; move window left, move window up, move window down, and the like. In fact, these commands can be even more complicated than that. Consider for example the specific voice command: move window right 10 inches. The user must not only say the direction, but also the number of units (for example 1–99) and the type of units (for example, inches, centimeter or pixels). Listing every possible combination would result in hundreds of commands that the user might have to sift through. A need exists for a simpler and more efficient method for listing commands having multiple forms.

SUMMARY OF THE INVENTION

In the WCIS window, instead of listing each and every possible version of each command, a simple notation in accordance with the inventive arrangements is employed to indicate that there are multiple things a user can say. These variables are shown between delimiters, for example "<variable>".

A method for displaying voice commands with multiple variables in a speech application, in accordance with the inventive arrangements, comprises the steps of: compiling a list of each voice command which can include at least one variable; storing with each the voice command each variable associated with each voice the command in the list; displaying in response to a user request a command and each of its associated variables; and, displaying each of the associated variables within delimiters to indicate to the user that a choice must be made from a set of choices for each the associated variable together with the command.

The method can further comprise the steps of: storing a set of choices for each stored variable; and, supplying in response to a user request the set of the choices for each the variable associated with the voice command and at least one word to use to select one of the choices in each the set when uttering the voice command.

The supplying step can be implemented by displaying a response in text form or by generating an audible response to the user or both, in response to a user selection.

The method of can further comprise the step of automatically terminating one or both of the displaying steps in response to any action undertaken by the user. The actions can include cursor movement, keyboard activation and uttering a voice command.

BRIEF DESCRIPTION OF THE DRAWINGS

FIG. 1 is a graphical user interface generated in accordance with the inventive arrangements.

DETAILED DESCRIPTION OF THE PREFERRED EMBODIMENTS

The WCIS function can be made available to all speech aware applications on a computer system. Programmers can add their own view with their active commands to the WCIS function. Applications can also add their own view with their active commands to the WCIS function. For example, dictation applications can display inline commands, that is commands which are spoken during dictation, dictation macros and a Stop Dictation command in a WCIS graphical user interface (GUI) window. When dictation stops, they can update the WCIS window can be updated with a Begin Correction and other valid commands. The general design for navigation by speech is to say what you can see, for example, the user can utter the name of a user interface control or command that the user sees, and the command will be executed.

In accordance with the inventive arrangements a simple notation is employed to indicate that there are multiple things a user can say, as shown in the FIG. 1. These variables are shown between delimiters, for example "<variable>". Consider move window as a first example. The system can show this as: Move Window <Direction> <Distance> <Unit>. To display the commands that a user can say to format text, the system can show: <Format Command> text. But now, the user needs to understand how to say these variables.

A voice command can be used to elicit this information. For example, one can use something like the voice command: How do I Say <variable>. Specific examples are: How Do I Say Distance and How Do I Say Direction. When the user utters the voice command the system displays an explanation showing how to say distance and an example of how to say the command. The system need not display this information as text in a window of a graphical user interface. The example can also be audible. So, instead of seeing text, the user would hear the explanation.

The FIG. 1 shows an example of a WCIS Active Program view in the form of a GUI 10 having a window 12. Cursor Movement is one command in a list 14 of categories of commands displayed in area 16 of window 12. The end of the word Movement is covered by a further window or balloon 18 disposed, for example, over the upper right hand corner of the window 12. Each category in the list 14 has a rotatable arrow 20 associated therewith, which can be used to show a sub-list 22 of specific cursor movement commands. Variables for distance are shown as "<1 to 20>". The commands displayed in the sub-list are menu items that contain accelerator keys, also referred to as hot keys, and the user interface controls of the active program. The active program is also referred to as the program that has focus. The program with focus has the uppermost window and responds to movements of the mouse or other controllers. The commands in list 14 relate to Text Editing, as indicated in area 23, of speech or dictation application for word processing. This view is present if the user has enabled Active Program commands when such functionality is available in a speech application.

The Active Program view can be provided with three pull down menus in the upper area 23 of the window or view. The menus can include, for example, a View menu accessed by button 24, an Action menu accessed by button 26 and a Help menu accessed by 28. It should be noted that each of the menus can be invoked by uttering Open View Menu, Open Actions Menu and Open Help Menu, or the like, depending upon the particular application.

The View menu can provide a list of different categories, selectable by manipulation of the arrows 20, in which the speech commands can be provided. The menu will contain, for example, nested lists of Text Editing commands, such as Cursor Movement, Text Editing, Text Selection and Clipboard Commands. Cursor Movement is illustrated in FIG. 1. The Action menu contains commands that can be performed against a voice command, for example Train, which brings up the train word dialog to train the command selected in the WCIS window, and Print, which prints the current page. The Help menu is conventional and need not be explained.

The action can also be described. So, when the user says: How Do I Say Format Commands, the system can show examples like Bold text, Uppercase text, Underline text and the like. When the explanations are displayed in a window, the window advantageously disappears with any mouse movement, any keyboard action, or the next voice command. Thus, the user does not have to take any special action.

In addition, if the user moves a mouse over one of these fields in the WCIS window (for example, distance), the system can display the information in the further window 18. This window does not disturb the list of commands but floats over the top of the list as shown in the Figure. The question posed in the upper area 30 of window 18 is answered in lower area 32, and in addition, one or more examples can be provided.

The inventive arrangements provide a notation on how to describe complicated voice commands. In addition, a means is provided so the user can determine how to say the command.

What is claimed is:

1. A method for displaying voice commands with multiple variables in a speech application, comprising the steps of:

compiling a list of each voice command recognizable in a concurrently executing program, at least one of said voice commands including at least one associated variable;

storing with each said voice command in said list said associated variables;

displaying in response to a user request a voice command and each of its associated variables; and, displaying each of said associated variables within delimiters to indicate to the user that a choice must be made from a set of choices for each said associated variable together with said voice command.

2. The method of claim 1, further comprising the steps of:

storing a set of choices for each stored variable; and, supplying in response to a user request the set of said choices for each said variable associated with said voice command and at least one word to use to select one of the choices in each said set when uttering said voice command.

3. The method of claim 2, comprising the step of implementing said supplying step by displaying a response in text form.

4. The method of claim 2, comprising the step of implementing said supplying step by generating an audible response to said user.

5. The method of claim 2, comprising the step of providing said user with an opportunity to select implementation of said supplying step by displayed text or generation of an audible response.

6. The method of claim 1, further comprising the step of automatically terminating at least one of said displaying steps in response to any action undertaken by said user.

7. The method of claim 6, wherein said actions include cursor movement, keyboard activation and uttering voice command.

8. The method of claim 1, further comprising the step of automatically terminating both of said displaying steps in response to any action undertaken by said user.

9. The method of claim 8, wherein said actions include cursor movement, keyboard activation and uttering voice command.

* * * * *